US006124537A

United States Patent [19]

de Lancie

[11] Patent Number: 6,124,537

[45] Date of Patent: Sep. 26, 2000

[54] WATER-REPELLING OCTAVE BOWL FOR AN OBOE

[76] Inventor: John S. de Lancie, 3644 Terra Granada #1B, Walnut Creek, Calif. 94595

[21] Appl. No.: 09/170,921

[22] Filed: Oct. 13, 1998

Related U.S. Application Data

[63] Continuation-in-part of application No. 08/842,168, Apr. 23, 1997, abandoned.

[51] Int. Cl.[7] .................... G01D 7/00

[52] U.S. Cl. .................... 84/380 R; 84/397

[58] Field of Search .................... 84/380 C, 380 B, 84/380 R, 397

[56] References Cited

U.S. PATENT DOCUMENTS 5,241,890 9/1993 Gulper .................... 84/380

*Primary Examiner*—Paul Ip

*Assistant Examiner*—Kim Lockett

*Attorney, Agent, or Firm*—David L. Banner

[57] ABSTRACT

The present invention features a water-repelling octave assembly consisting of an octave bowl having an elongated, hollow portion extending beyond the inner wall of the octave well into the bore of an oboe. The extended portion of the octave vent prevents moisture within the oboe's bore from entering the octave bowls and thereby disabling the upper register of the instrument. The inventive octave bowl provides an oboe which can be played for prolonged periods of time without need for swabbing by eliminating the accumulation of water in the oboe's octave vents. The invention also works well with the English horn, oboe d'amore and may be applied to other woodwind instruments.

18 Claims, 7 Drawing Sheets

WATER-REPELLING OCTAVE BOWL FOR AN OBOE

This application is a Continuation-in-part of my U.S. patent application Ser. No. 08/842,168, filed Apr. 23, 1997, now abandoned, titled WATER-REPELLING OCTAVE BOWL FOR AN FOR OBOE.

FIELD OF THE INVENTION

The present invention relates to double reed musical instruments and, more particularly to a water-repelling octave bowl assembly for use with an oboe, English horn or oboe d'amore.

DESCRIPTION OF THE PRIOR ART

To produce musical sounds, an oboe player blows warm, moist air through a reed into the bore of the oboe. As it enters the bore of the oboe, the air becomes cooler, and water generally condenses on the surface of the bore. Because the oboe is held in a nearly vertical position while being played, the condensed water tends to run down the bore. In oboes and other members of the oboe family such as the English horn and oboe d'amore, the octave vents are the first two openings in the bore below the reed. Water thus tends to accumulate in one or both of the oboe's two octave bowls, often filling one or both of them. When this occurs, none of the notes requiring the use of the octave bowls (i.e., notes requiring the depression of an octave key) can be played until the accumulated water is removed. The water accumulation is a frequent and very disturbing occurrence, as is the ever-present fear that the water accumulation will take place during a public performance.

To remove accumulated water from the octave bowls, the player must perform a ritual which is not only time-consuming but is potentially distracting to a concert audience. First, the reed must be removed from the top of the instrument. The upper segment or "joint" of the oboe must then be separated from the middle section (lower joint). The bore of the upper segment must then be swabbed with an absorbent material to remove the water on the surface of the bore. Next, water-absorbing paper must be placed under each octave key. All other keys on the upper segment must be closed and the bottom opening of the upper segment must be sealed with a finger. Air must then be blown into the opening from which the reed was removed. As a result, water in each octave bowl in forced into and absorbed by the water-absorbent paper. Finally, the instrument must be reassembled. During the 200 plus years of existence of the oboe, no other method has been found which satisfactorily removes accumulated water from the octave bowls.

U.S. Pat. No. 5,241,890 for SPEAKER VENT, issued Sep. 7, 1993 to Avrahan Galper teaches a structure for improving the "speaking" of certain notes in a clarinet. At first glance, the Galper structure may appear similar to the water-repelling octave bowls of the present invention. Galper teaches a resonant structure penetrating the wall of the clarinet body near the lower end of a body segment. The volume required for the Galper structure to perform its intended, tone-enhancement function is stated to be between 200 and 285 $mm^3$.

In contradistinction, the volume of the inventive water-repelling octave bowl is approximately 80 $mm^3$ without a vent installed and only approximately 20 $mm^3$ with the octave vent installed. The inventive octave bowl must be located precisely at and used in conjunction with the existing octave key and vent structures in the top-most region of the upper oboe segment. Even minor variations in internal volumes or in the placement of the structure may result in serious degradation of tone quality, scale (intonation-uniformity of notes across the playable range of the instrument), or responsiveness (the ability to make notes "speak" uniformly) in the oboe. The object of the inventive structure is to NOT affect the tonal characteristics of the oboe. The Galper structure, on the other hand, is designed to provide a totally opposite effect, namely TO alter the tonal characteristics of the clarinet.

The water-repelling octave bowls of the present invention protrude into the bore of the instrument but do not extend beyond the outer surface of the instrument. This is necessitated by the need for the octave bowls and octave vents to properly interact with their respective octave key mechanisms at the surface of the instrument. The Galper structure, on the other hand, MUST extend beyond the outer surface in order to enclose the required internal air volume.

Further, the Galper structure is not designed to prevent water entry into a tone hole or to work cooperatively with an octave bowl/octave vent apparatus.

Virtually every disclosed design detail of Galper teaches away from the design precepts and requirements of the inventive water-repelling octave bowl.

It is, therefore, an object of the invention to provide a water-repelling octave bowl structure for use in double reed instruments such as the oboe, English horn and oboe d'amore which prevent accumulation of water in the octave bowls.

It is a further object of the invention to provide a water-repelling octave bowl which may easily be fitted to existing oboes.

SUMMARY OF THE INVENTION

The present invention features a water-repelling octave assembly consisting of an octave bowl having an elongated portion extending beyond the inner wall of an oboe. The extended portion of the octave vent prevents the condensed moisture on the oboe's bore surface from wicking, seeping, or being forced into the octave bowls and thereby disabling the upper register of the instrument.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Generally speaking this invention relates to double reed musical instruments, especially those of the oboe family and, more particularly to a novel improvement to the octave bowl/octave vent assembly which prevents the accumulation of water in the instrument's octave bowls.

Figure 1:
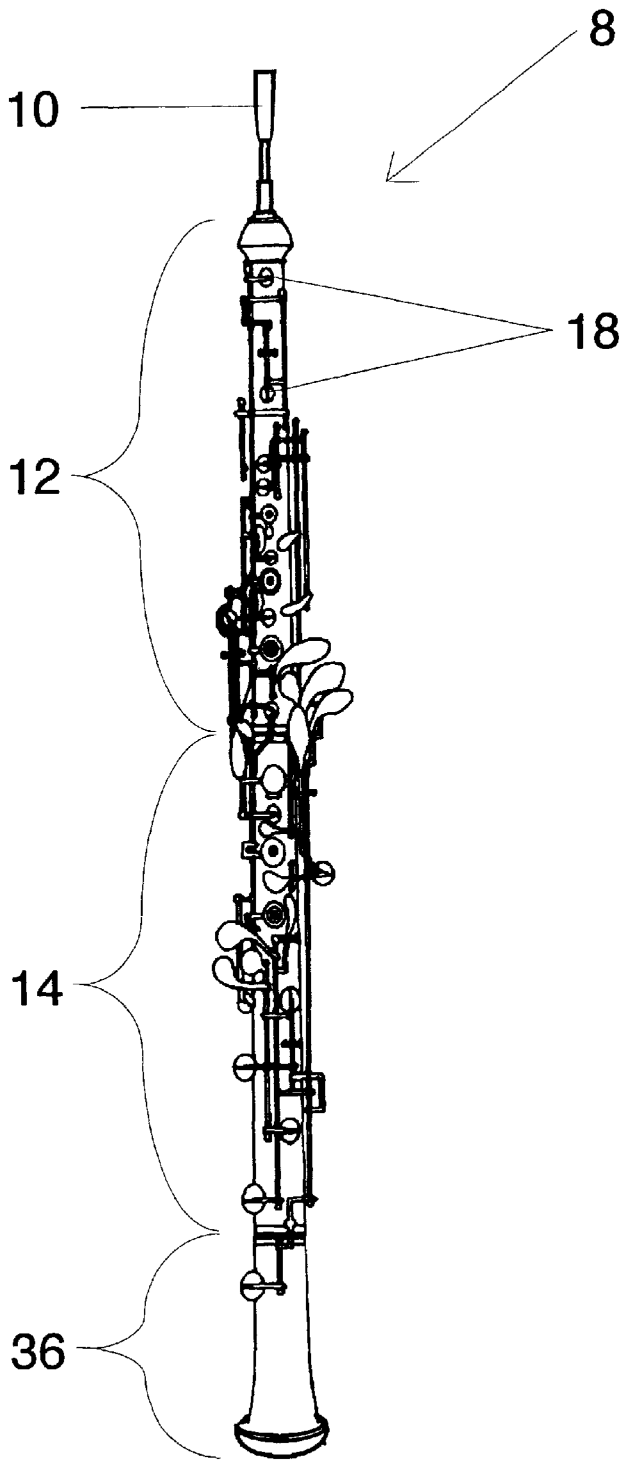
FIG. 1 is a perspective view of an entire modern oboe.

Referring first to FIG. 1, there is shown a view of a typical, modern oboe, generally at reference number 8. A double reed 10 is inserted into the upper, distal end an upper segment or joint 12 of the oboe 8. Two octave keys 18 are shown near the upper end of upper segment 12 of the oboe. A lower segment 14 is shown affixed to upper segment 12. Finally, a bell 36 is shown affixed at the lower distal, end of lower segment 14 of the oboe 8.

Figure 2:
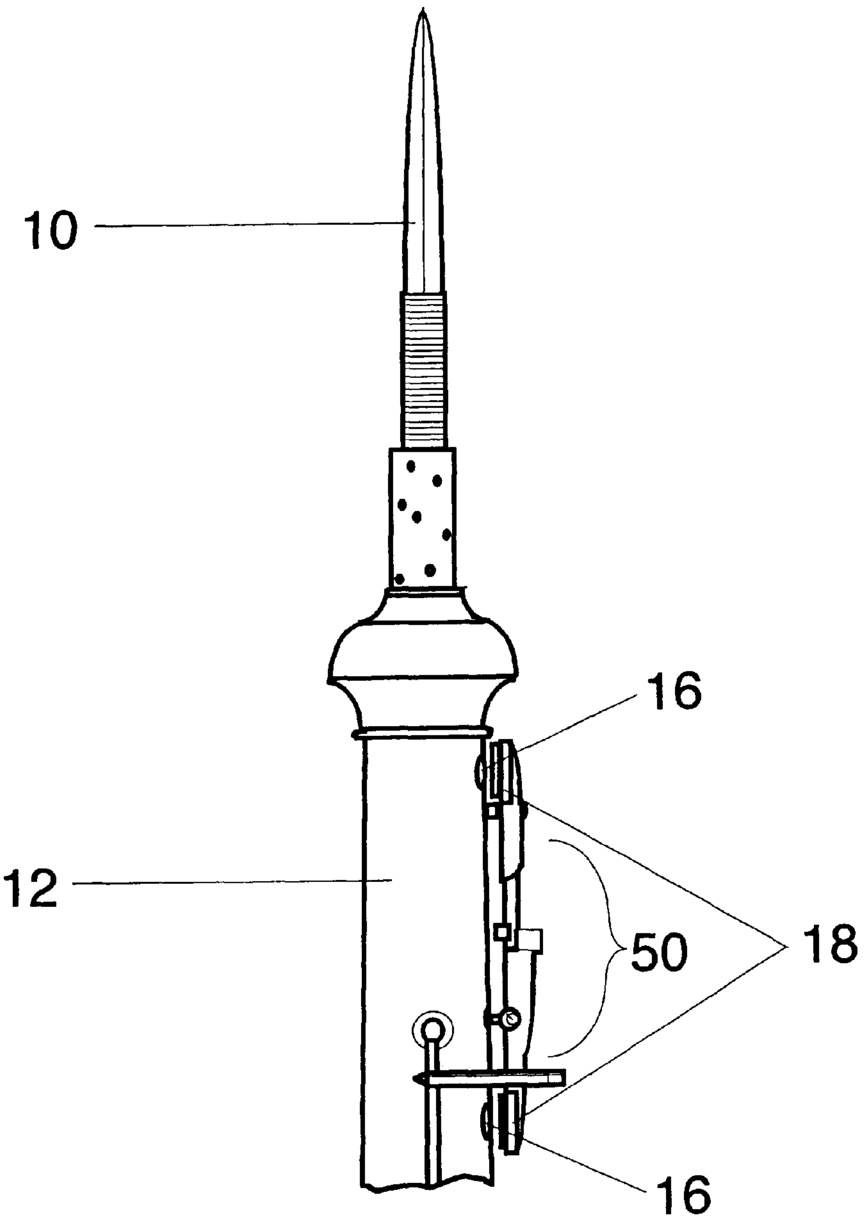
FIG. 2 is a side view of a portion of the upper segment of the oboe depicted in FIG. 1.

Referring now to FIG. 2, there is shown a detailed drawing of the upper portion of upper segment 12. Octave keys 18 are shown in an open (undepressed) position with octave assemblies 16 penetrating the body of upper segment 12 positioned immediately beneath each of the octave keys 18. Octave assemblies 16 will be described in more detail hereinbelow.

Figure 3:
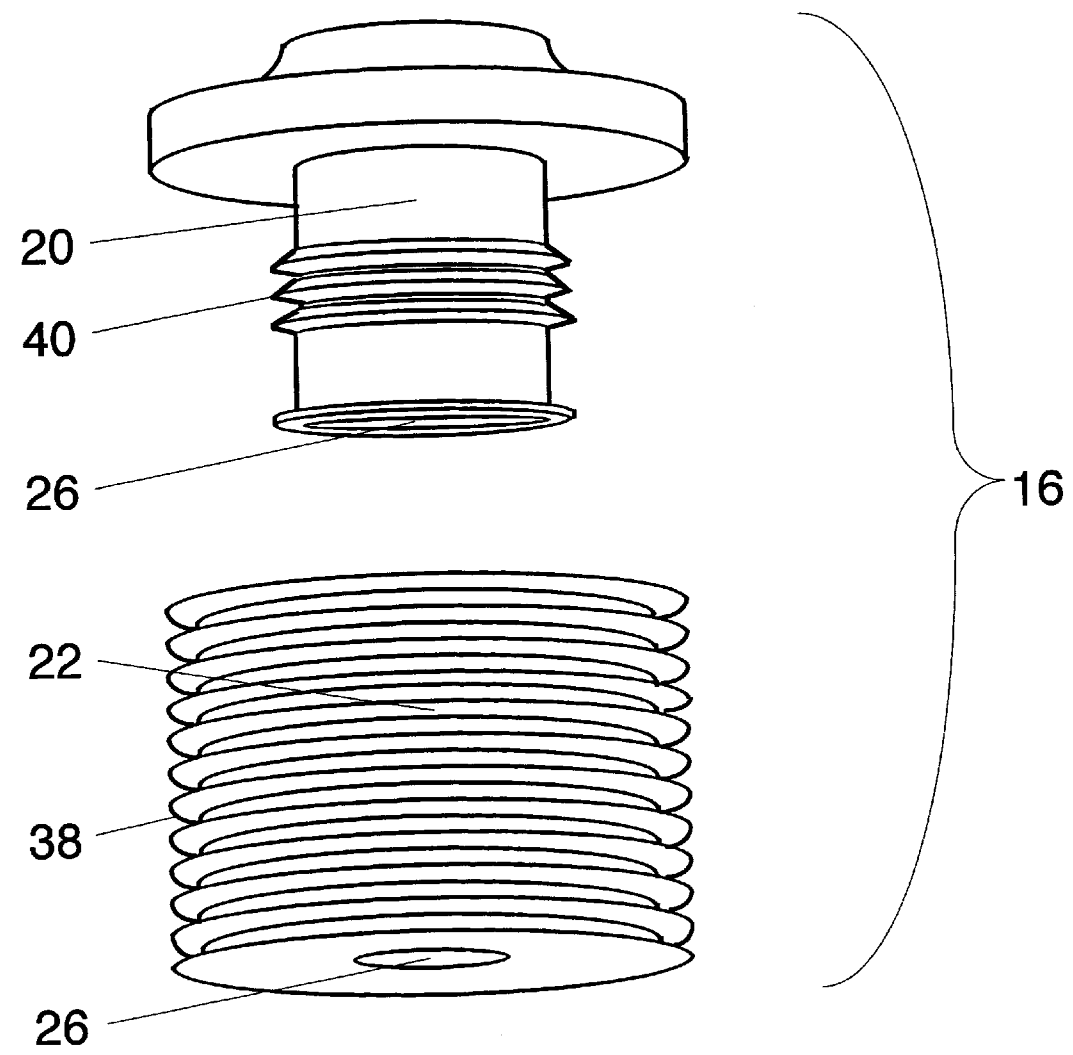
PRIOR ART FIG . 3
FIG. 3 is an exploded view of a non water-repelling octave assembly of the prior art.
Figure 5:
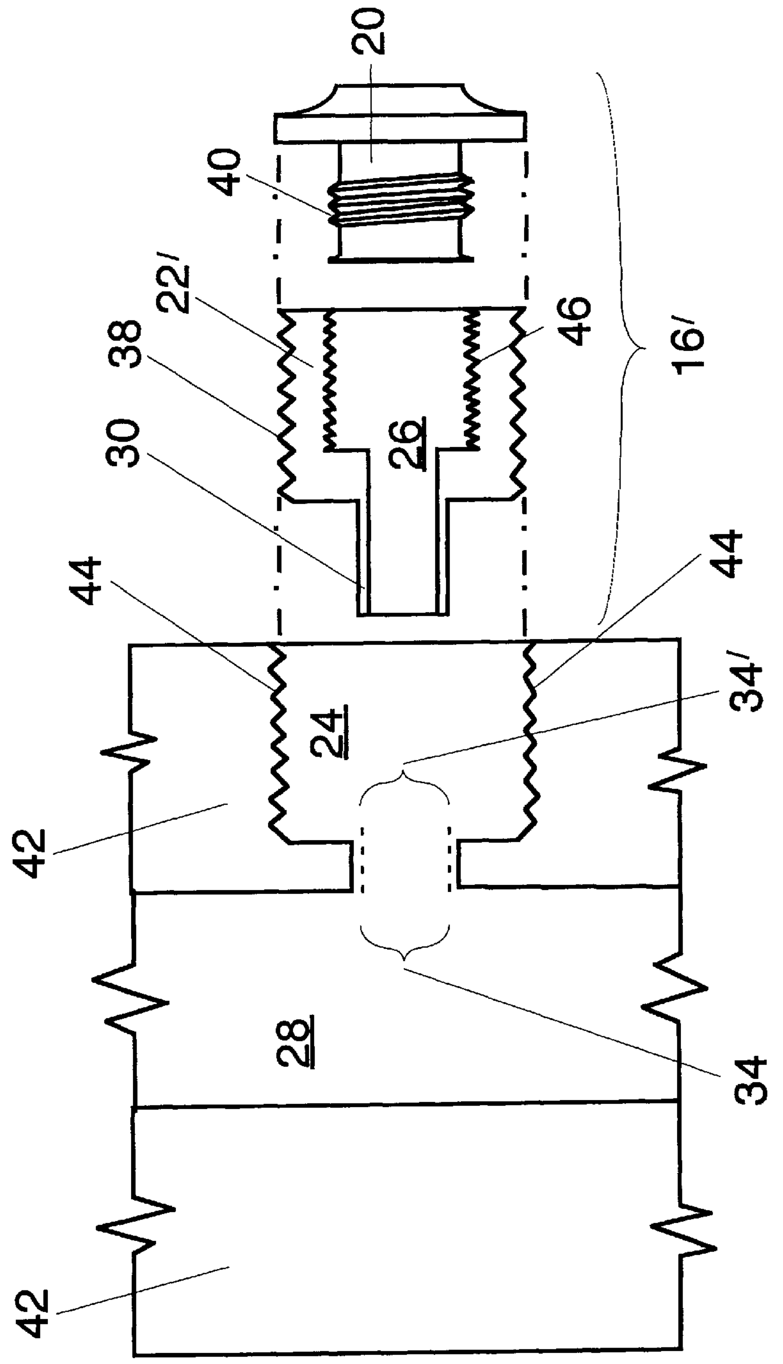
FIG. 5 is an exploded, sectional view of both the inventive octave assembly and a portion of the upper segment of an oboe.

Referring now to FIG. 3, there is shown an exploded, perspective view of an octave assembly 16 of the prior art. An octave bowl 22 is shown having a central bore 26. Exterior threads 38 on octave bowl 22 provide for the retention of octave bowl 22 in an octave well 24 (FIG. 5). Internal threads 46 (FIG. 5) in bore 26 of octave bowl 22 are adapted to receive mating, external threads of a lower portion of octave vent 20.

Figure 4:
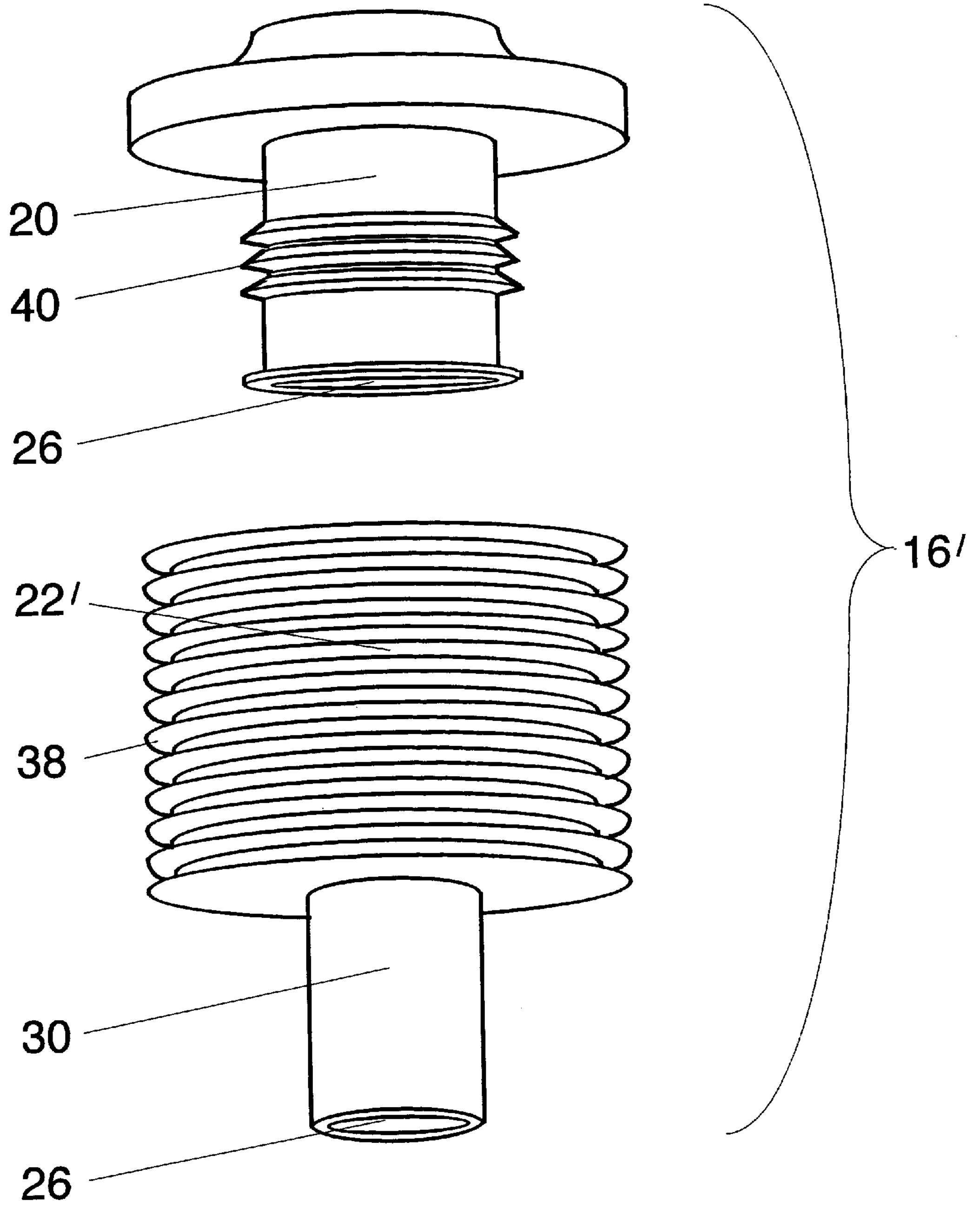
FIG. 4 is an exploded view of the water-repelling octave assembly of the present invention.

Referring now to FIG. 4, there is shown an exploded, perspective view of the inventive octave assembly 16'. Like octave assembly 16 of the prior art, octave assembly 16' consists of octave bowl 22' and octave vent 20. Octave bowl 22' is constructed to accept a "standard" octave vent 20 (i.e., an octave vent having the same general dimensions and threads identical to the de facto standard employed by F. Lorée of Paris and many other oboe makers). It will be obvious to those skilled in the art that inventive octave bowl 22' could be adapted to accept octave vents of other overall dimensions and/or thread patterns. Octave bowl 22' will generally be manufactured from metal such as brass (preferably with silver, chrome or suitable plating) or nickel ("German") silver. The only requirements for the metal are that it be machinable, that it not corrode in use in the oboe and the it provide dimensional stability in use. Gold could be used although the cost may be prohibitive. Sterling silver and stainless steel appear to have the necessary corrosion resistance and dimensional stability but their difficulty in machining may also limit their use in this application. It is possible that octave bowl 22' could be constructed from a polymer or other material meeting the machinability, corrosion resistance and dimensional stability requirements. Nylon® appears to be a suitable material. Bore 26 extends through both octave bowl 22' and octave vent 20. External threads 38 on octave bowl 22' are provided for securing octave bowl 22' into octave well 24 (FIG. 5). Internal threads 46 (FIG. 5) in bore 26 of octave bowl 22' are adapted to receive mating, external threads 40 of a lower portion of octave vent 20. Unlike octave bowl 22 (FIG. 3) of the prior art, inventive octave bowl 22' has an extended lower portion 30 adapted to extend through octave well 24 (FIG. 5)and the corresponding octave tone hole 34' (FIG. 5) and into the oboe bore 28 (FIG. 5). Extended portion 30 is essentially tubular and, in the preferred embodiment, has an outside diameter of approximately 0.1 inch, an inside diameter of approximately 0.08 inch and a wall thickness of approximately 0.01 inch. Ii will be obvious to those skilled in the art that other structure with other dimensions could be constructed to meet particular operating requirements without deviating from the scope and spirit of the invention.

Referring now also to FIG. 5, there is shown an exploded, cross sectional view of a portion of the upper segment 12 (FIG. 1) of a double reed instrument. The side walls 42 of the instrument are shown surrounding the central bore 28. An octave tone hole 34' penetrates bore 28 and provides an air passage between bore 28 and the outside of the instrument 9 (FIG. 1). Octave tone hole 34' has a diameter larger than original octave tone hole 34. The octave tone hole is enlarged using techniques well known to persons skilled in the art of woodwind instrument repair. Octave well 24 is shown coaxially aligned with octave tone hole 34'. Octave well 24 generally is not modified to accommodate inventive octave bowl 22' but suitable modification could be made if required for a particular circumstance. Threads 44 in the side of octave well 24 are adapted to mate with corresponding external threads 38 present on octave bowl 22'. Octave vent 20 with external threads 40 is shown ready for insertion into octave bowl 22' where it is retained by internal threads 46.

Figure 6:
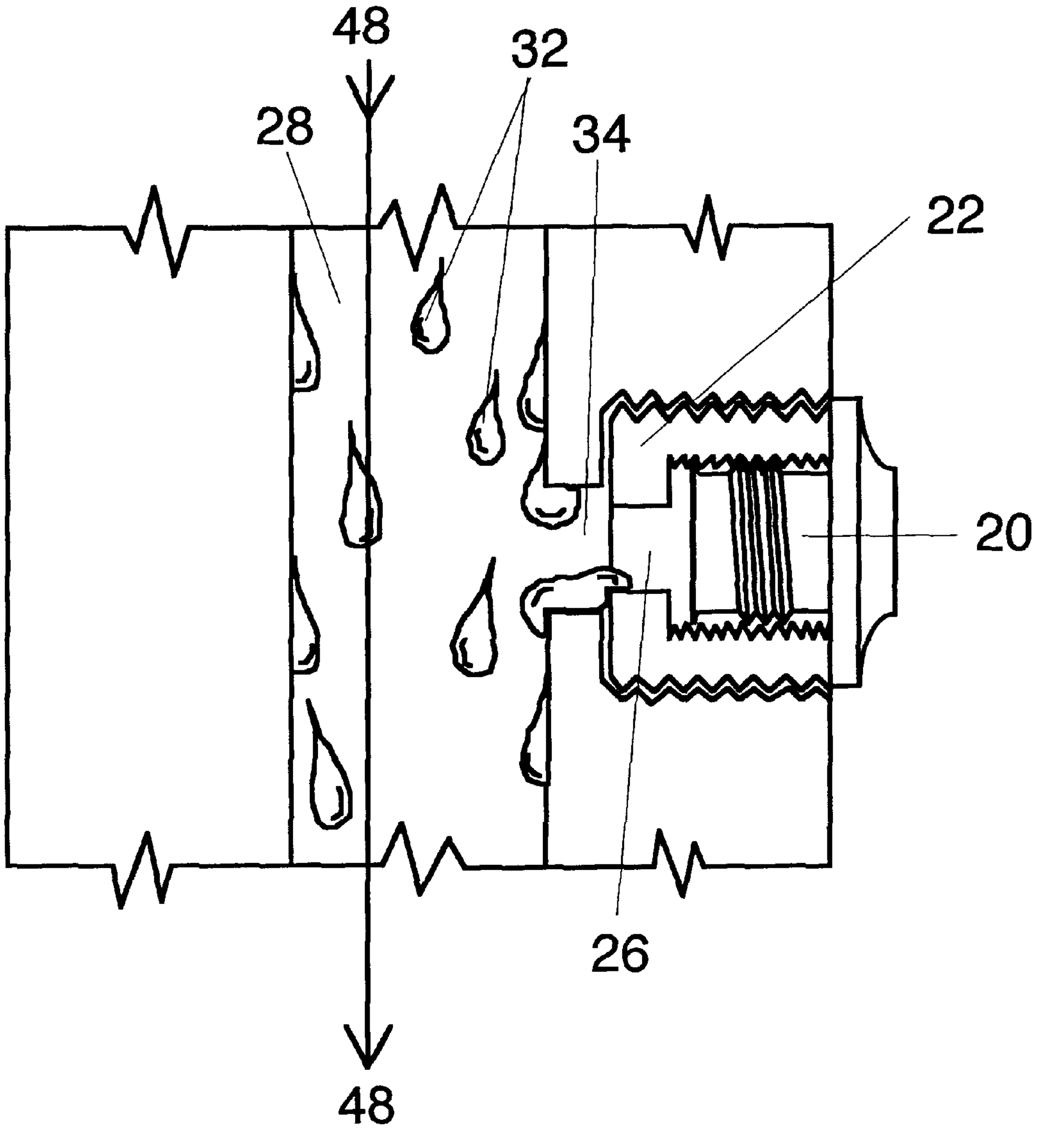
FIG. 6 is a sectional schematic view of a non water-repelling octave assembly of the prior art in place in the wall of an oboe.
Figure 7:
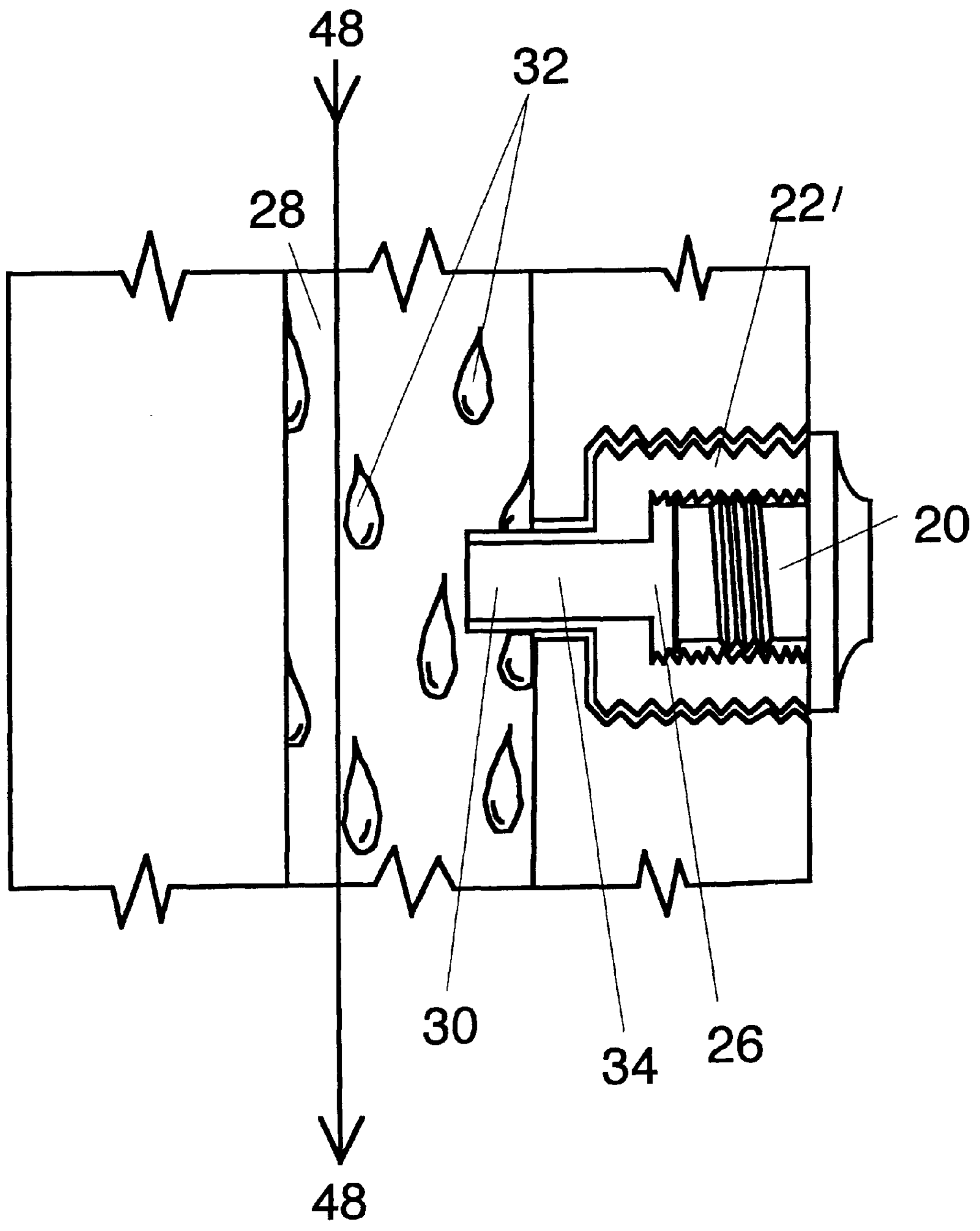
FIG. 7 is a sectional schematic view of the inventive, water-repelling octave assembly in place in the wall of an oboe.

Referring now to FIGS. 6 and 7, there are shown cross sectional, schematic views of prior art octave bowl 22 and inventive octave bowl 22' assembled into a portion of the upper segment of a typical double reed instrument, respectively. During playing, warm, moist air enters the upper segment 12 (FIG. 1) of the instrument through reed 10 (FIG. 1) Consequently, warm, moist air blown by a player (not shown) into reed 10 and subsequently into the bore (interior region) 28 of upper segment 12 will quickly condense on the cooler surface of bore 28. In the prior art (FIG. 6), water droplets 32 condensed from the warm, moist air entering the instrument through reed 10 (FIG. 1) are shown in bore 28. Because, when played, the instrument is held in a nearly vertical position, water droplets 32 tend to run down along bore 28 in the direction shown by arrow 48. A water droplet near octave tone hole 34 is free to enter octave tone hole 34 and, under the pressure of the air (not shown) flowing through bore 28, is forced into the bottom of octave bowl 22. Water droplets 32 tend to accumulate in bowl 22 until bore 26 of octave bowl 22 and octave vent 20 are completely blocked, thus rendering the instrument unplayable in its upper register. Even a partial blockage of bore 26 of octave bowl 22/octave vent 20 can have a deleterious effect on the performance of the instrument.

Using the improved octave bowl 22' of the present invention (FIG. 7), water droplets 32 still form in bore 28 of the upper segment of the instrument. Water droplets 32 also still tend to run down bore 28 in the direction of arrow 48. When water droplets 32 encounter octave tone hole 34, the extended portion 30 of octave bowl 22' prevent the passage of water droplets 32 into octave tone hole 34 and, consequently, prevent accumulation of water in octave bowl 22'. The protrusion of extended portion 30 of octave bowl 22' into bore 28 varies from instrument to instrument and depends upon the instrument type (i.e., oboe, English horn, or oboe d'amore) as well as the individual characteristics of the instrument. For a typical oboe, a penetration of approximately 0.025 inch. In a typical oboe having a bore 28 of approximately 0.15 inch in the region of the octave tone holes, the distance from the end of extended portion 30 to the far side of bore 28 is then approximately 0.125 inch. In other words, extended portion 30 extends approximately 16% of the diameter of bore 28. A variation of ±5% has been found typical in applying the inventive water-repelling octave bowl 22' to a number of different oboes. More important than the actual penetration of extended portion 30 into bore 28 is the control of the internal volume of the entire octave assembly including octave bowl 22', octave vent 20 and extended portion 30. It has been found that an internal volume of approximately 20 $mm^3$ is typical. In addition, the diameter of the bore 26 of octave bowl 22' and octave vent 20 must be kept between 0.026 and 0.032 inch (6.5 and 8.2 mm).

Because octave tone holes 34 associated with octave keys 18 (FIG. 1) are the topmost (i.e., closest to the reed) perforations in the body of upper segment 12 (FIG. 1), the probability of water entering octave tone holes 34 is high. In addition, because of the unique function of the octave key 18/octave vent 20, even a slight amount of water accumulation causes an immediate and almost always dire consequence. The inventive octave bowl system virtually eliminates the accumulation of water in octave bowls 22' and creates a far more reliably playing instrument.

The inventive octave bowls 22' have been designed to be installed in existing double reed instruments. This operation consists of disassembling the keywork 50 (FIG. 2) for the octave keys 18 (FIG. 1). Octave vent 20 (FIG. 6) may then be unscrewed from the existing octave bowl 22 (FIG. 6). Octave bowl 22 may then be unscrewed from octave well 24. In some cases, octave bowl and octave vent 20 may be removed as a unit. Octave tone holes 34 may need to be rebored to accommodate extended portion 30 of the improved octave bowl 22'. Once octave tone holes 34 have been rebored (if required), the improved octave bowls 22' may be screwed into octave wells 24 and octave vents 20 then re-installed. The keywork for octave keys 18 may then be reassembled and the instrument regulated and returned to service.

It will be obvious to those skilled in the art that the concepts of the present invention may be extended to keys other than the octave keys of not only the double reed instruments chosen for purposes of disclosure but to other woodwind instruments as well.

Since other modifications and changes varied to fit a particular operating requirement and/or environment will be apparent to those skilled in the art, the invention is not considered limited to the example chosen for purposes of disclosure, and covers all changes and modifications which do not constitute a departure from the true spirit and scope of the invention.

Having thus described the invention, what is desired to be protected by Letters Patent is presented in the subsequent appended claims.

What is claimed is:

1. A water-repelling octave bowl assembly for use in a double reed instrument having a plurality of keys and pads associated therewith, comprising:

a) at least one octave tone hole extending from an interior region (bore) of said double reed instrument to an exterior region thereof, said at least one octave tone hole having a first diameter and interacting with a key;

b) an octave well, located proximate said exterior region of said double reed instrument, said octave well for receiving an octave assembly, being coaxially aligned with said at least one octave tone hole; and c) an octave assembly comprising:

i) an octave bowl for insertion into said octave well, said octave bowl receiving an octave vent, said octave bowl having a hollow, extended portion having an exterior diameter essentially equal to said first diameter of said at least one octave tone hole, said hollow, extended portion fitting within said at least one octave tone hole and protruding into said interior region of said double reed instrument beyond an interior terminus of said at least one octave tone hole; and ii) an octave vent for insertion into said octave bowl;

whereby moisture accumulating in said interior region of said double reed instrument is substantially prevented from entering said octave bowl.

2. The water-repelling octave bowl assembly for use in a double reed instrument as recited in claim 1, wherein said double reed instrument comprises at least one from the group of Oboe, English Horn, Oboe d'amore.

3. The water-repelling octave bowl assembly for use in a double reed instrument as recited in claim 2, wherein said octave bowl assembly further comprises exterior threads adapted to mate with corresponding interior threads of said octave well whereby said octave bowl assembly is removably retained in said octave well.

4. The water-repelling octave bowl assembly for use in a double reed instrument as recited in claim 3, wherein said octave bowl further comprises interior threads and said octave vent further comprises exterior threads adapted to mate with said interior threads of said octave bowl whereby said octave vent is removably retained in said octave bowl.

5. The water-repelling octave bowl assembly for use in a double reed instrument as recited in claim 4, wherein said octave bowl assembly comprises metal.

6. The water-repelling octave bowl assembly for use in a double reed instrument as recited in claim 5, wherein said metal comprises at least one from the group of brass, stainless steel, sterling silver, nickel silver, gold.

7. The water-repelling octave bowl assembly for use in a double reed instrument as recited in claim 6, wherein said at least one metal further comprises a plated layer.

8. The water-repelling octave bowl assembly for use in a double reed instrument as recited in claim 6, wherein said hollow, extended portion of said octave bowl protrudes into said interior region of said double reed instrument beyond an interior terminus of said at least one octave tone hole approximately 0.025 inch.

9. The water-repelling octave bowl assembly for use in a double reed instrument as recited in claim 6, wherein said octave bowl including said hollow, extended portion of said octave bowl has an interior volume of approximately 20 cubic mm.

10. The water-repelling octave bowl assembly for use in a double reed instrument as recited in claim 6, wherein said hollow, extended portion of said octave bowl has a wall thickness of approximately 0.01 inch.

11. The water-repelling octave bowl assembly for use in a double reed instrument as recited in claim 4, wherein said octave bowl assembly comprises a polymer.

12. The water-repelling octave bowl assembly for use in a double reed instrument as recited in claim 11, wherein said polymer comprises Nylon®.

13. The water-repelling octave bowl assembly for use in a double reed instrument as recited in claim 11, wherein said hollow, extended portion of said octave bowl protrudes into said interior region of said double reed instrument beyond an interior terminus of said at least one octave tone hole essentially 0.025 inch.

14. The water-repelling octave bowl assembly for use in a double reed instrument as recited in claim 11, wherein said octave bowl including said hollow, extended portion of said octave bowl has an interior volume of approximately 20 cubic mm.

15. The water-repelling octave bowl assembly for use in a double reed instrument as recited in claim 11, wherein said hollow, extended portion of said octave bowl has a wall thickness of approximately 0.01 inch.

16. A method for equipping a double reed instrument having a plurality of keys having key pads associated therewith with a water-repelling octave bowl, the steps comprising:

a) providing a double reed instrument having at least one standard, non water-repelling octave bowl associated with at least one octave tone hole, said octave tone hole interacting with a key;

b) removing said at least one standard, non water-repelling octave bowl;

c) enlarging at least one octave tone hole in said double reed instrument to a predetermined diameter; and d) replacing said at least one standard, non water-repelling octave bowl with a water-repelling octave bowl having a protruding hollow, extended portion having an outside diameter essentially equal to said predetermined diameter of said at least one octave tone hole.

17. The method for equipping a double reed with a water-repelling octave bowl as recited in claim 16, wherein the step (b) of removing said at least one standard, non water repelling octave bowl comprises the sub-step of:

i) removing at least one octave vent from said standard, non water-repelling octave bowl.

18. The method for equipping a double reed with a water-repelling octave bowl as recited in claim 17, wherein the step (d) of replacing said at least one standard, non water repelling octave bowl with a water-repelling octave bowl having a protruding hollow, extended portion comprises the sub-step of:

ii) replacing said at least one octave vent in said water-repelling octave bowl.

* * * * *